United States Patent [19]

Benattar et al.

[11] Patent Number: 4,786,411

[45] Date of Patent: Nov. 22, 1988

[54] FLUID TREATMENT APPARATUS WITH SEMI-PERMEABLE MEMBRANES

[75] Inventors: Robert Benattar, Lyons; Michel Cronenberger, Givors, both of France

[73] Assignee: Hospal Industrie, Meyzieu, France

[21] Appl. No.: 770,901

[22] Filed: Aug. 30, 1985

Related U.S. Application Data

[63] Continuation of Ser. No. 482,617, Apr. 6, 1983, abandoned, which is a continuation of Ser. No. 314,523, Oct. 26, 1981, abandoned.

[30] Foreign Application Priority Data

Nov. 13, 1980 [FR] France .................. 80 24477

[51] Int. Cl.[4] .................................. B01D 13/00
[52] U.S. Cl. .................. 210/321.4; 210/493.1; 210/493.3
[58] Field of Search .............. 210/321, 433, 493.1, 210/493.3, 541, 321.77; 55/158; 422/48; 482/617

[56] References Cited

U.S. PATENT DOCUMENTS

| | | | |
|---|---|---|---|
| 3,585,131 | 6/1971 | Esmond | 210/321.4 |
| 3,780,870 | 12/1973 | Esmond | 210/321.4 |
| 3,827,563 | 8/1974 | Boe et al. | 210/321.3 |
| 4,051,041 | 9/1977 | Riede | 210/541 X |
| 4,110,220 | 8/1978 | Lavender | 210/456 X |
| 4,113,625 | 9/1978 | Riede | 210/541 X |
| 4,213,858 | 7/1980 | Boberg et al. | 210/497.1 X |

FOREIGN PATENT DOCUMENTS 55-70303  5/1980  Japan.

OTHER PUBLICATIONS

Bellhouse, B. J. et al., International Appl. Pub. Under PCT, WO80/01042, May 29, 1980.
U.S. Dept. of Commerce, Patent Office Academy, Formality Term List, Topic 7d, (two pages), 1977.

*Primary Examiner*—Frank Sever
*Attorney, Agent, or Firm*—Gerald D. Sharkin; Robert S. Honor; Walter F. Jewell

[57] ABSTRACT

The invention relates to an apparatus comprising a stack of plates having plates of a type A and a type B alternating. Each plate has exposed channels and a semi-permeable membrane 1 turned over one of its edges 2. The membranes extend into the exposed channels 8, 8a–9, 9a to provide locations for the passage of the fluid to be treated flowing between the two superposed membranes 1 arranged between two adjacent plates A and B. Further exposed channels 13, 15, 17, 19 are used for the passage of the treating fluid flowing between the face of each plate in the exchange and/or separation zones 3, 3a of the plates A and B thereon and the adjacent membrane. If each plate A is symmetrical relative to a median plane perpendicular to one edge 2, each plate B of the stack can be considered as a plate A which has been turned through 180 degrees about a median axis perpendicular to the edge 2.

14 Claims, 7 Drawing Sheets

FLUID TREATMENT APPARATUS WITH SEMI-PERMEABLE MEMBRANES

This application is a continuation of application Ser. No. 482,617 filed Apr. 6, 1983, now abandoned, which application is a continuation of application Ser. No. 314,523 filed Oct. 26, 1981 now abandoned.

DESCRIPTION

The present invention relates to fluid treatment apparatus comprising a stack of plates each possessing an exchange and/or separation zone on each of their faces, it being possible for the said apparatus to be used, for example, as an artificial kidney.

Apparatuses resulting from the stacking of plates are known, but they have disadvantages arising, in particular, from the fact that it is necessary, in these apparatuses, either to cut holes in the membranes before they are mounted on the plates or after the plates and the membranes have been stacked, and to provide special devices of the "disc" type for ensuring leak-tightness at the points where the membranes are cut and for allowing the fluid to pass through at these points, or to provide passages for a fluid in channels located in the body of the plate, so that the fluid can pass from the outside of one plate up to that zone of the plate in which the exchange and/or separation take place. Thus, apparatuses such as those described above are difficult to manufacture, either because of the complexity of the moulds for manufacturing the plates themselves, or because of the complexity of their assembly, which does not facilitate the automation thereof. Furthermore, because of their structure and the constraints due to the injection-moulding techniques, apparatuses of this type are generally fairly bulky, in particular as a result of the thickness of the "discs" referred to above, or because of the fact that the passages inside the body of a plate are such that this plate must have a thickness of at least 1.2 mm.

According to the present invention, we provide fluid treatment apparatus comprising:

(a) a stack of superposed plates, the stack having plates of a type A alternating with plates of a type B;

(b) a semi-permeable membrane overlying each of the two opposite major faces of each plate of the stack;

(c) an exchange and/or separation zone on each of said faces of each plate;

(d) distribution zones on each face of each plate, with a distribution at each opposite end of each exchange and/or separation zone;

(e) two exposed first channels formed in each of said faces and extending from one edge of the plate, the first channels of one face of a plate being in back-to-back superposed relation to the first channels of the other face, said semi-permeable membranes each overlying and extending into said first channels of the associated plate, to provide a location where a fluid to be treated may be introduced between membranes located between adjacent plates and the treated fluid discharged from between said two membranes, said first channels communicating with said exchange and/or separation zones via said distribution zones;

(f) a first hole extending through each plate and connecting one of said distribution zones on one face of that plate with a distribution zone on the opposite face thereof;

(g) a second exposed channel located on one face of each plate and communicating with said first hole;

(h) a second hole extending through each plate;

(i) a third exposed channel located on the opposite face of each plate to said one face on which the second exposed channel is located and communicating with said second hole, the first and second holes of a plate of type A being superposed with the first and second holes respectively of a plate of type B, the second and third exposed channels of a plate of type A being on the opposite faces to those of a plate of type B.

Such an apparatus can have a large membrane surface area per unit volume. Each plate, with an exchange and/or separation surface on each face, can have a thickness which is generally less than 1.2 mm, preferably less than 1 mm and in particular between 0.5 and 1 mm. It is not necessary to cut holes in the membranes, or, if they are cut, this is done solely for the passage of the fluid which is to circulate in contact with the plates, and this, furthermore, does not require the presence of a "disc".

The apparatus of the present invention lends itself to simple automation of its assembly. The plates, by virtue of their structure, can be formed using simple injection moulds which do not require, in particular, lateral movable inserts.

In order that the present invention will be understood more clearly the following description is given, merely by way of example, reference being made to the accompanying drawings, in which.

An apparatus according to the present invention results, for example, from the alternate stacking of the plates A and B shown in FIGS. 1 to 4, each having a semi-permeable membrane 1 on each of its faces, and each membrane 1 being folded around an edge 2 of the associated plate. It must be pointed out here that if the present application refers to faces of the plates A or B, it is quite obvious that these are the two main faces of each of the said plates, that is to say the faces having the larger surface area. It should be understood that the resulting stack will consist of, in seriatim, a plate A, two membranes 1, a plate B, two membranes 1, a plate A and so on.

Figure 2:
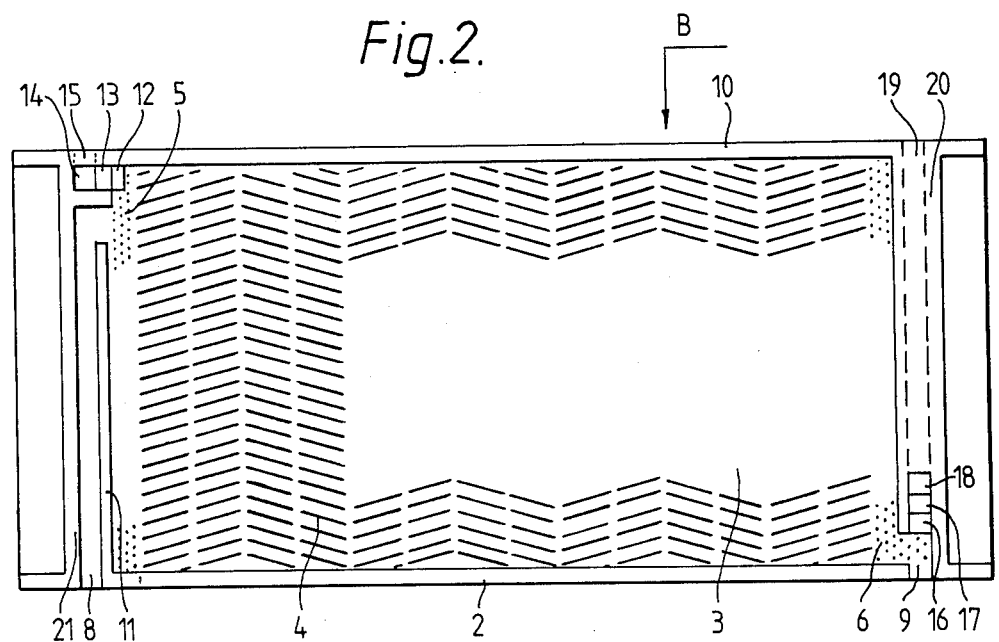
FIG. 2 is a top view of one embodiment of plate B of the same apparatus.
Figure 3:
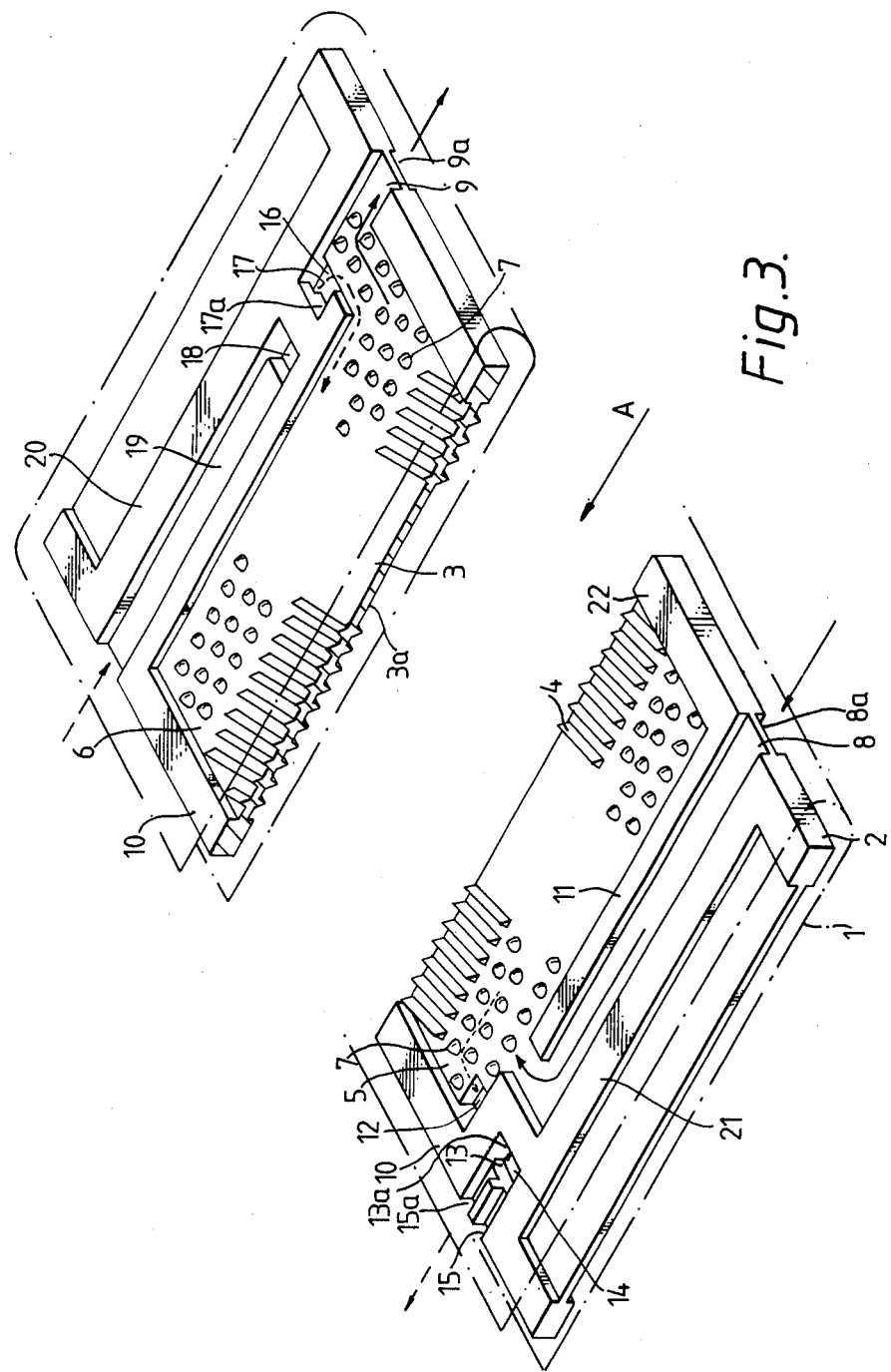
FIG. 3 is a perspective view, with part broken away, of a plate A shown in FIG. 1.
Figure 4:
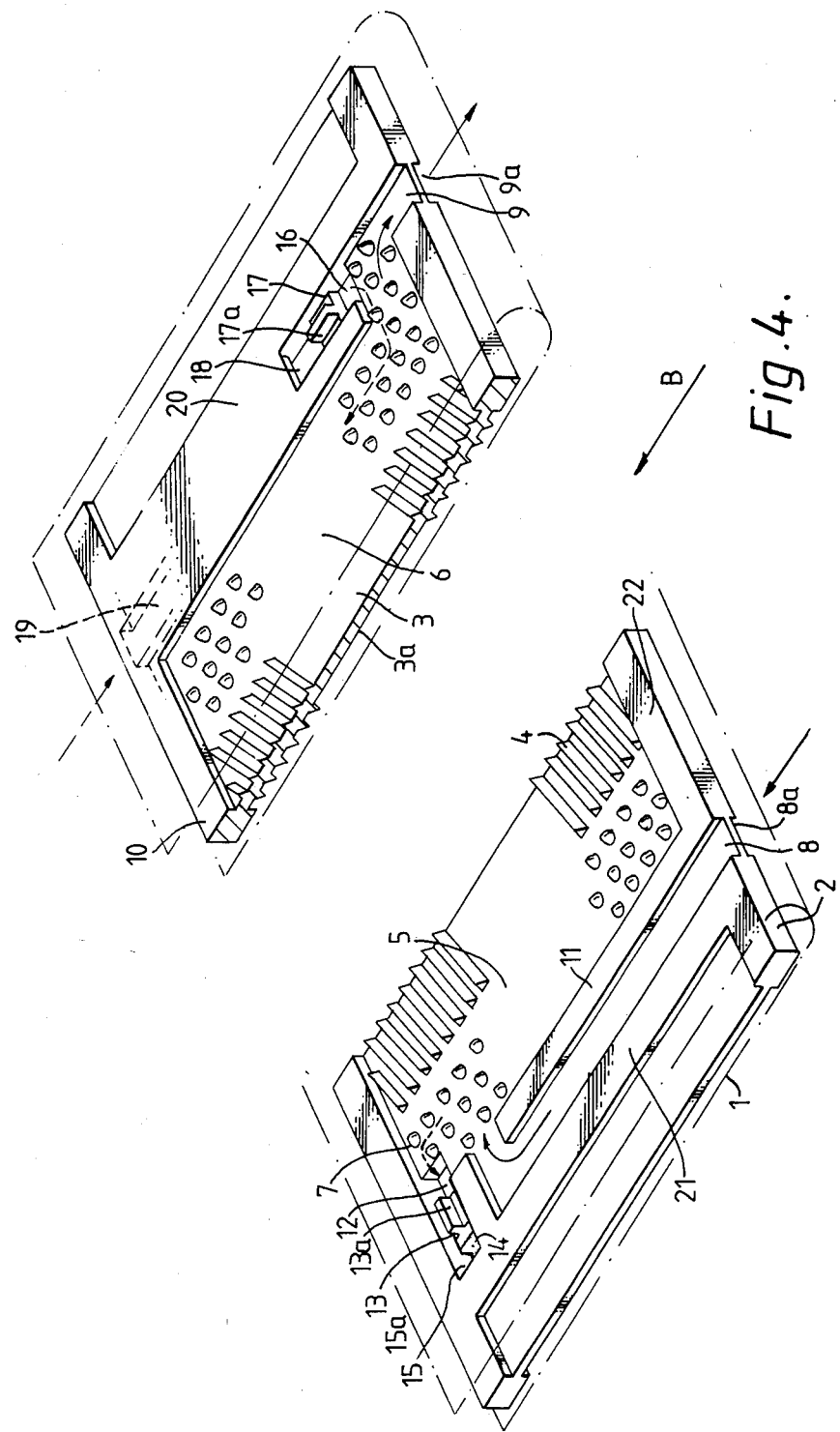
FIG. 4 is a perspective view, with part broken away, of a plate B shown in FIG. 2.

In FIGS. 3 and 4, the membranes 1 are shown as transparent, and diagrammatically, in order to show that they are folded around the edge 2 of each plate A and B, but it must be understood that the membranes 1 lie flat against the edges 2 in an apparatus according to the present invention. During the stacking of the plates A and B with the membranes 1 thereon, the edges 2 of each plate are superposed so that, in the stack obtained, the edges 2 form a lateral face of the said stack. The final apparatus further comprises lateral plates and upper and lower plates for pressing the stack and holding it together, the said lateral plates further possessing means for introducing and discharging the fluids, which will be referred to below. Apparatuses fitted with a device of this type, which is referred to as a device for holding and distributing fluids, are known in the prior art, and since this device does not form the subject of the present invention, it has not been drawn in FIGS. 1 to 4 for the purpose of simplification.

The plates A and B shown in FIGS. 1 to 4 can be used for an exchange apparatus of the haemodialyser type, and the description which now follows will refer more particularly to this type of application of the said apparatus, in which the blood flows between the two membranes 1 which are located between each two adjacent plates A and B, and in which the dialysis liquid flows between the faces of each plate and the membranes 1.

Figure 1:
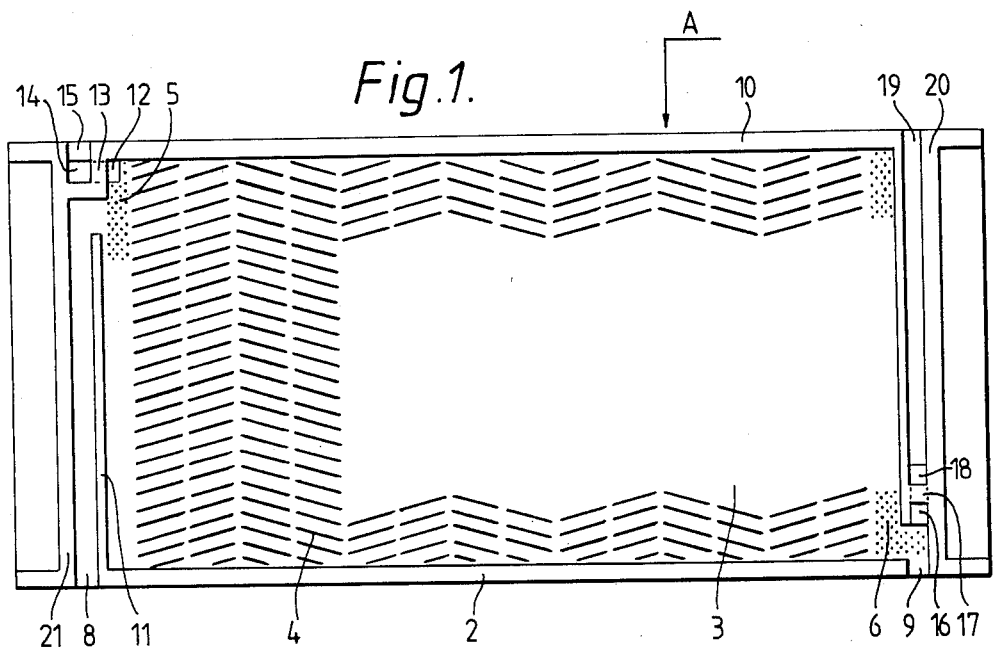
FIG. 1 is a top view of one embodiment of plate A of one form of apparatus according to the present invention.

Each plate A and B has an exchange zone 3, 3a on each of its faces, these exchange zones being provided with, for example, bars 4 or ribs only shown in part in FIGS. 1 and 2, and the angle between the latter and the longitudinal axis of the plate being such that, when the plates A and B are superposed, the opposite bars 4 of the two plates intersect. Each plate A and B also has a so-called "distribution zone" 5 and 6 adjacent each end and on each face, these zones 5 and 6 having, for example, a multitude of small projecting points 7.

Each plate A and B has, on each of its faces, starting from the edge 2 covered by the membrane 1, two groups of exposed channels 8, 8a and 9, 9a, located back-to-back, each of these exposed channels emerging in the distribution zone 5 or 6 on that face of a plate. The channels 8 and 8a extend into the zone 5, at a point near the edge 10 opposite the edge 2, because of the provision of a baffle 11 on each face of each plate A and B. When the two membranes are clamped between adjacent faces of each adjacent plate A and plate B, they are pressed down into channels 8, 8a and 9, 9a, so that inlet and outlet ducts are formed for the flow of blood therebetween.

A plate B has, in the distribution zone 5 and near the edge 10, a hole 12 passing through the plate, and an exposed channel 13, 13a located on that face of the plate having the exchange zone 3, the said channel being connected to the first hole 12 and to a second hole 14 passing through the plate, the hole 14 itself being connected to a second exposed channel 15, 15a located on the other face of the plate, that is to say the face having the exchange zone 3a, and this second channel 15, 15a extending to the edge 10 of the plate.

Towards the other end, the plate B has, in the distribution zone 6 and near the edge 2, a hole 16 passing through the late, and it has an exposed channel 17, 17a on that face of the plate having the exchange zone 3. The said exposed channels 17, 17a are connected to a second hole 18 passing through the plate, this second hole 18 being connected to an exposed channel 19 passing through the edge 10 of the plate and located on the opposite face of the plate to that in which the exposed channel 17, 17a is located.

A plate B has two ridges 20 and 21 towards its longitudinal ends, the ridges 20, 21 and the edge portions 2 and 10 substantially corresponding to the basic thickness of the plate. The channels 13, 13a–15, 15a–17, 17a and 19, and also the holes 14 and 18, are located in the plate B at points where the thickness corresponds to that of the edge portions 2, 10 and ridges 20 and 21. Furthermore, the membrane 1 turned around the edge 2 of the plate B covers the channels 8, 8a and 9, 9a and also the ridges 20, 21 and edge portion 10. Advantageously, as shown more clearly in FIG. 4, a plate B is also provided with a small continuous extra thickness on each edge portion 2, 10 and ridges 20 and 21, this extra thickness, which is referred to by those skilled in the art as "boss beading" or a "bead", serving to ensure a better leak-tightness of the membrane/plate units in contact during stacking. In FIG. 4, this small extra thickness is shown by the broken line 22. An extra thickness of this type is generally provided only on one face of the plate. To simplify the drawing, this line 22 has not been shown on the plate B of FIG. 2.

A plate A comprises substantially all the characteristics of the plate B described above. A plate A thus has, in the distribution zone 5 and near the edge 10, a hole 12 passing through the plate, and an exposed channel 13, 13a located on that face of the plate having the exchange zone 3a, that is to say on the lower face of the plate A shown in FIG. 3. This channel 13, 13a is connected to the first hole 12 and to a second hole 14 passing through the plate, this hole 14 itself being connected to a second exposed channel 15, 15a located on the other face of the plate, that is to say on the face having the exchange zone 3.

Towards the other end, the plate A has, in the distribution zone 6 and near the edge 2, a hole 16 passing through the plate, and it has an exposed channel 17, 17a on that face of the plate having the exchange zone 3a, namely the lower face. This exposed channel 17, 17a is connected to a second hole 18 passing through the plate, this second hole 18 being connected to an exposed channel 19 extending to the edge 10 of the plate and located on the upper face of the plate, that is to say on the opposite face to that in which the exposed channel 17, 17a is located.

A plate A also has two ridges 20 and 21 towards its longitudinal ends, the edge portions 2, 10 and the ridges 20 and 21 substantially corresponding to the basic thickness of the plate. The channels 13, 13a–15, 15a–17, 17a and 19, and also the holes 14 and 18, are located in the plate A at points where the thickness corresponds to this basic thickness. Furthermore, the membrane 1 turned around the edge 2 of the plate A covers the channels 8, 8a and 9, 9a and also the ridges 20, 21 and edge portion 10. Advantageously, as with the plate B described above, a plate A has a small continuous extra thickness on each edge portion 2, 10 and ridges 20, 21 in order to ensure better leak-tightness of the stack of plates and membranes, this extra thickness being shown in FIG. 3 by a broken line 22. To simplify the drawing, this line 22 has not been shown on the plate A of FIG. 1

As is apparent from the above description, in an apparatus according to the present invention, the alternate stacking of the plates A and B is such that the exposed channels 8, 8a–9, 9a–15, 15a–13, 13a–17, 17a and 19 in a plate A are superposed on the exposed channels in the adjacent plate B, and vice versa, and this advantageously applies to the holes 12, 14, 16 and 18. Furthermore, as is clearly apparent from FIGS. 3 and 4, in an apparatus according to the present invention, two successive plates A and B are in contact [via the membranes 1] at the points corresponding to the back of the faces having the channels 13, 13a–15, 15a–17, 17a and 19.

The flow of the fluids in an apparatus comprising plates A and B and the membranes 1, stacked alternately, takes place in the following manner, the adopted convention being that the direction of circulation of the fluid [blood] circulating between the membranes 1 is shown by solid arrows, whilst the direction of circulation of the fluid [dialysate] circulating between the faces of the plates and the membranes 1 is shown by dotted arrows. With reference to FIGS. 3 and 4, the blood enters between the two membranes located between the alternately stacked plates A and B at the location of the channels 8, 8a and passes between the opposite membranes of two successive plates. Once it has arrived near the end of the baffles 11, still between the two membranes 1, the blood divides up at the location of the so-called distribution zones 5 and passes through the opposite exchange zones 3, 3a of the plates A and B. The blood reaches the distribution zones 6 and leaves the stack at the location of the opposite channels 9, 9a in the two successive plates, having constantly circulated between the two membranes 1. It is thus seen that, by virtue of the baffles 11, it can be considered that the inlets and outlets for the blood are arranged diagonally opposite one another, as a result of which all the streams of blood flowing between the membranes 1 have to cover substantially the same path length when passing over the exchange faces 3, 3a, because the pressure loss is the same for all the paths taken by the blood. The effect of this uniformity of flow is substantially to improve the quality of the transfers of matter between the blood and the dialysis liquid.

The dialysis liquid [or dialysis bath or dilaysate] enters between the plate A (see FIG. 3) and its associate membrane through the channel 19 and arrives at the hole 18. This liquid then passes through the channel 17, 17a located on the other face of the plate and arrives at the hole 16, where it divides up, on each face of the plate, in the distribution zones 6. The dialysis liquid then flows through the exchange zones 3 and 3a, on each face of the plate, between the membrane 1 and the face in question. It reaches the distribution zones 5, and the two parts of this liquid combine in the hole 12 to pass into the channel 13, 13a, to reach the hole 14 and to leave the plate through the channel 15, 15a. The dialysis liquid circulates in contact with the faces of the plate B, passing through the channels and holes having the same reference numerals as those of the plate A. In the apparatus according to FIGS. 1 to 4, because of the positioning of the holes 12 and 16 of the plates A and B, it is possible to consider that the inlets and outlets for the dialysis liquid are arranged diagonally on each plate.

It must be pointed out that, in the alternately stacked plates A and B described above, each exposed channel can in fact comprise several mutually parallel channels, as shown on the plates A and B of FIGS. 3 and 4. Furthermore, in a stack of plates A and B described above, it is not essential for the exposed channels 15, 15a and 19 to emerge on the side of the edge 10 which is opposite the edge 2 through which the blood enters. Thus, these channels can emerge at the end faces of the ridges 20 and 21 and even on the edge 2, in the part which is not included under the membrane 1. As regards the shape of the exposed channels, this can obviously be very varied. By way of non-limiting examples, the cross-section of these channels can thus be in the shape of a semi-circle or a semi-ellipse in addition to the rectangular trough shape described above. However, it must be clearly understood that the expression "exposed channel" denotes a channel which forms a groove on one face of the plate A or B in question, this groove nevertheless being covered by a membrane 1 in the stack of plates A and B of the apparatus. In an apparatus such as that described above, it is possible for the plates A and B not to have the baffles 11, particularly if the plates are relatively long compared with their width. Moreover, an apparatus according to the present invention can comprise plates A and B of which the distribution zones 5 and 6 are arranged parallel to the edges 2 and 10 of the plates shown in FIGS. 1 to 4, the fluids then flowing on the plates over the shortest length of the exchange zone.

It is also important to note that, in an apparatus according to the present invention, a plate A can be symmetrical relative to a median plane perpendicular to the edge 2 covered by a membrane, and that, in this case, each plate B of the stack can be considered as a plate A which has been turned through 180 degrees about a median axis perpendicular to the edge 2 covered by the membrane 1. Thus, the plates A and B of the stack can be obtained from the same mould.

Figure 5:
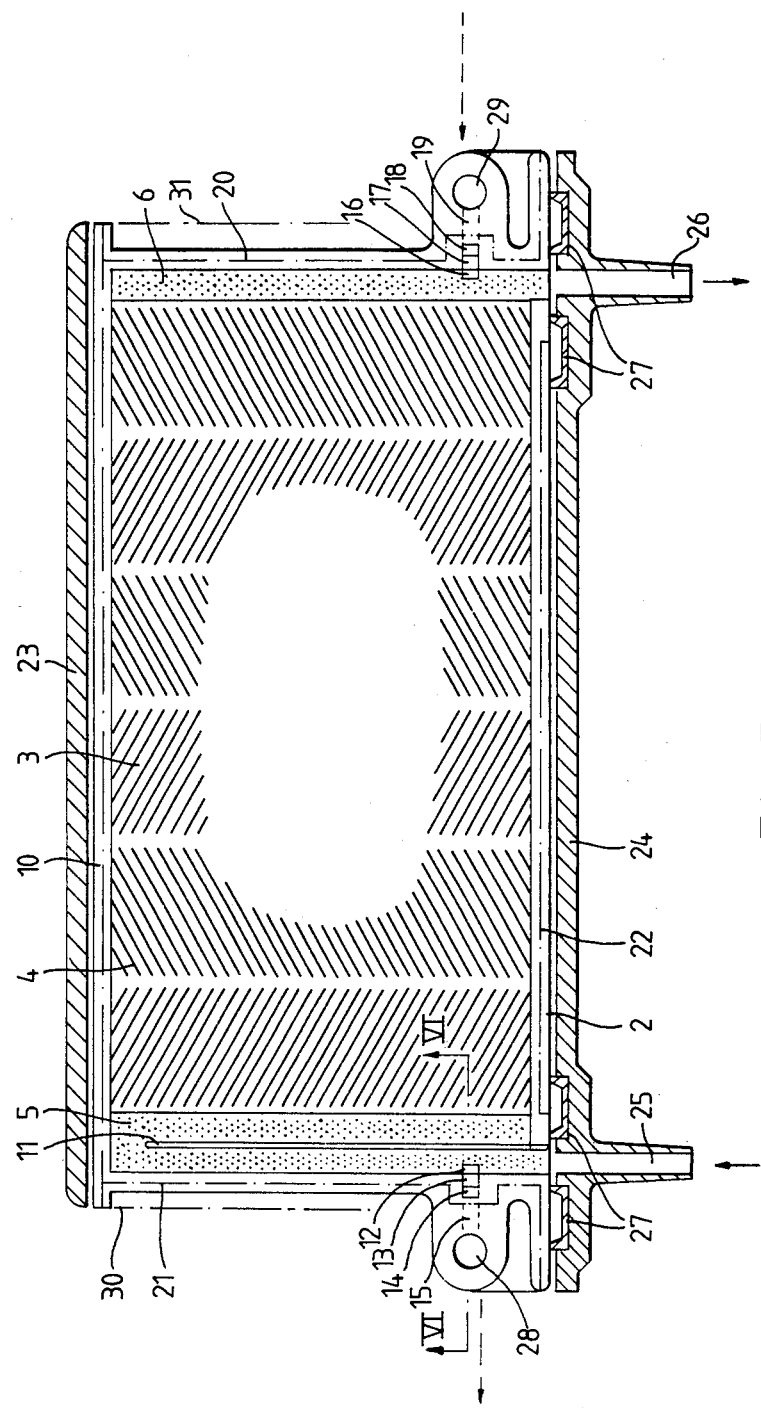
FIG. 5 is a top view, partly in section, of another embodiment of an apparatus according to the present invention.

Another embodiment of an apparatus according to the present invention is shown in FIGS. 5 to 9. FIG. 5 shows how a plate B is mounted in an apparatus, the plate itself not being shown in section, whereas the lateral plates 23 and 24 of the holding device of the apparatus are shown in section. One of these lateral plates, namely the one shown by 24, is provided with a tube 25 for introducing the fluid flowing between the membranes [blood] and a tube 26 for discharging this fluid after it has flowed in the exchange zone 3 of the plates A and B of the stack. To make the drawing clearer, the tubes 25 and 26 have been shown in one and the same plane of section, but they can be in different planes. To ensure the leak-tightness between the lateral plate 24 having the tubes 25 and 26, and the edge 2 of the plates A and B possessing the exposed channels 8, 8a and 9, 9a, gaskets 27 are provided at these points.

Figure 6:
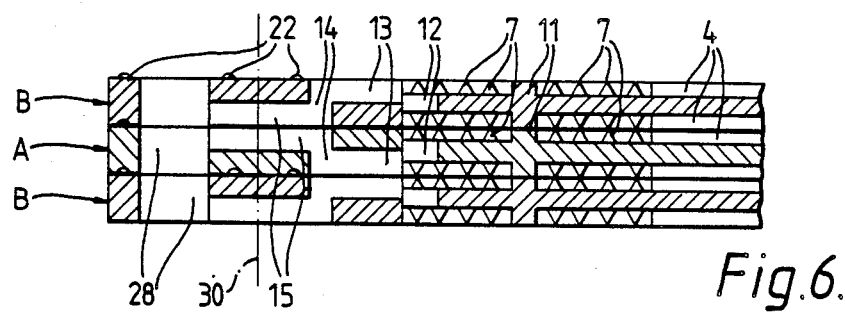
FIG. 6 is a scrap section along the plane VI—VI of FIG. 5.
Figure 7:
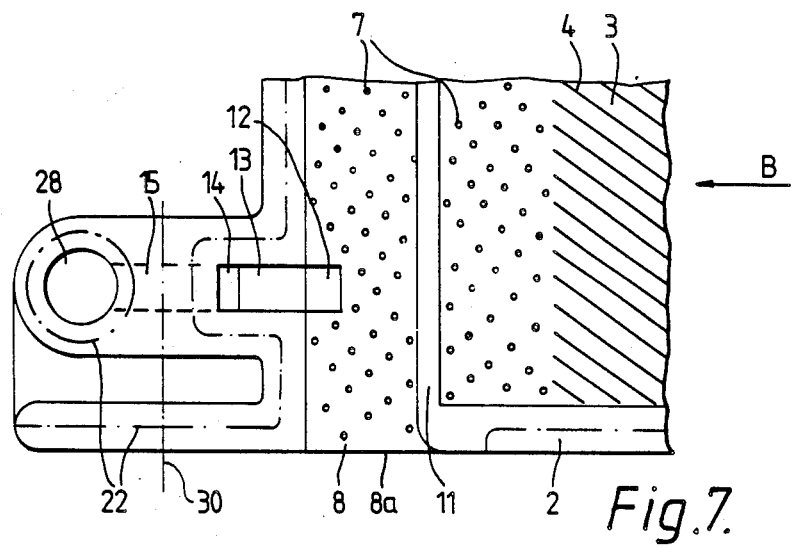
FIG. 7 is a top view of a portion of plate B of the apparatus shown in FIG. 5.
Figure 8:
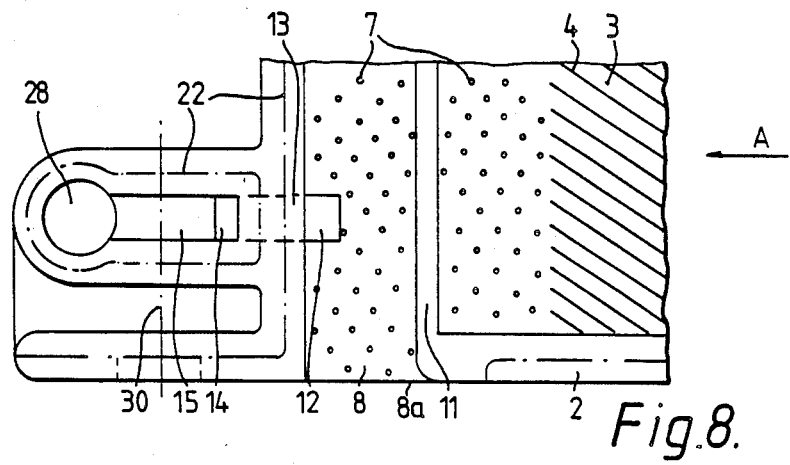
FIG. 8 is a top view of a portion of plate A of the apparatus shown in FIG. 5.

In the same way as the apparatus described above, this apparatus results from the alternate stacking of plates A and B with two membranes between each plate. FIG. 6 shows a stack of this type in partial section. The plates A and B of this apparatus all have the structural characteristics of the apparatus according to FIGS. 1 to 4, and the same reference numerals have therefore been retained for denoting them. The main difference in the apparatus according to FIGS. 5 to 9 is the fact that the channels 15 and 19 in each plate A and B do not emerge on the edge 10, but in passages 28 and 29 passing through the ridges 21 and 20 at the ends of the plates. Thus, in the stack, the passages 28 and 29, which are not covered by the membranes 1, form internal channels for the flow of the fluid [dialysis liquid] flowing between the faces of the plates A and B and the adjacent membranes.

Figure 9:
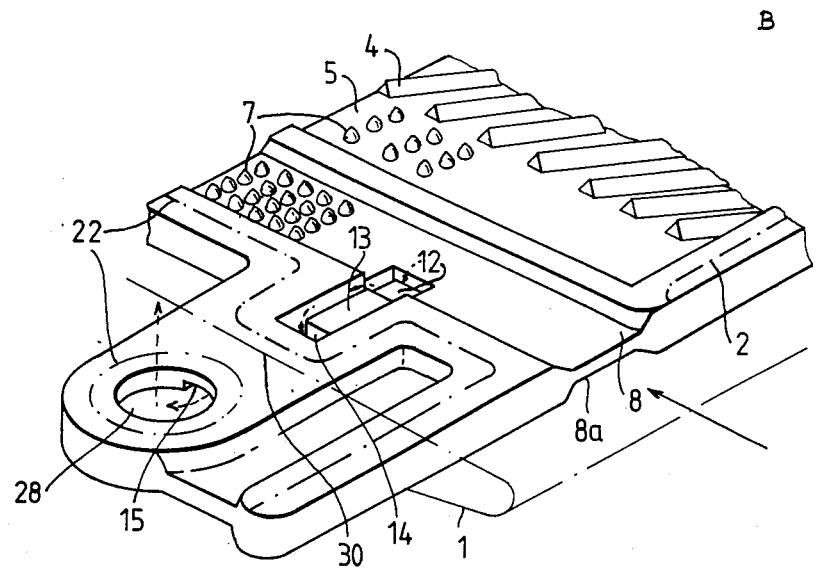
FIG. 9 is a perspective view showing portions of the plate A and of the plate B shown in FIGS. 7 and 8.
Figure 9:
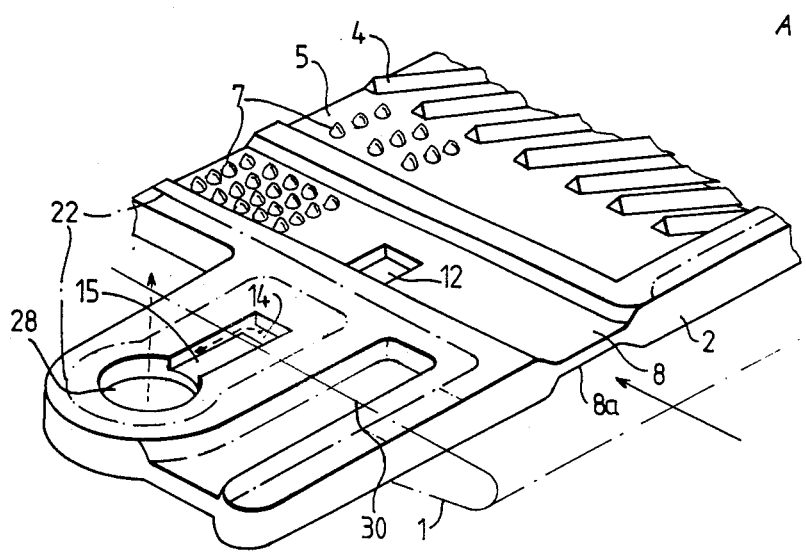

FIG. 9 shows, in perspective, the positioning of the exposed channels 8, 8a, 13 and 15 on each plate A and B, and also of the passage 28 passing through the plates. The membranes have been shown as transparent and each plate A and B comprises a membrane on each of its faces, each membrane being turned around the edge 2 of each plate. The position of the side edges of each membrane 1 on each end ridge 20 and 21 of the plates A and B is indicated at 30 and 31, from which it can be seen that the membranes overlie the channels 15 and 19, but not the passages 28 and 29.

In an apparatus such as that described above and relating to FIGS. 5 to 9, the blood enters the apparatus through the tube 25 and leaves it through the tube 26 after having passed between the membranes 1 of the adjacent plates A and B, in the same way as in the apparatus according to FIGS. 1 to 4. As regards the dialysis liquid, this enters the apparatus through a tube [not shown] communicating with the duct formed by the superposed passages 29, emerging from the passage 29 in each plate, passes through the channel 19, the hole 18, the channel 17 and the hole 16 in each plate, passes in contact with the faces of the plates A and B, passes through the hole 12, the channel 13, the hole 14, the channel 15 and the passage 28 in each plate, and leaves the stack through a tube [not shown] communicating with the duct formed by the superposed passages 28 in each plate.

As has been stated in respect of the apparatus according to FIGS. 1 to 4, it is possible, if appropriate, for the plates of the apparatus according to FIGS. 5 to 9 not to have baffles 11, in particular in the case where their length is substantially greater than their width. Moreover, as has been stated for the apparatus according to FIGS. 1 to 4, in the apparatus according to FIGS. 5 to 9, each plate A can be symmetrical relative to a median plane perpendicular to the edge 2 covered by a membrane 1, and in this case, each plate B of the stack can be considered as a plate A which has been turned through 180 degrees about a median axis perpendicular to the edge 2 covered by a membrane 1.

Furthermore, it should be noted that, in the apparatus according to FIGS. 5 to 9, the membranes 1 can, if appropriate, cover the passages 28 and 29 when the stack is assembled, and that holes are then subsequently cut in these passages. In this case, it is advantageous to provide passages 28 and 29 very close to the edge of ridges 20 and 21, in order not to lose too much membrane.

Figure 10:
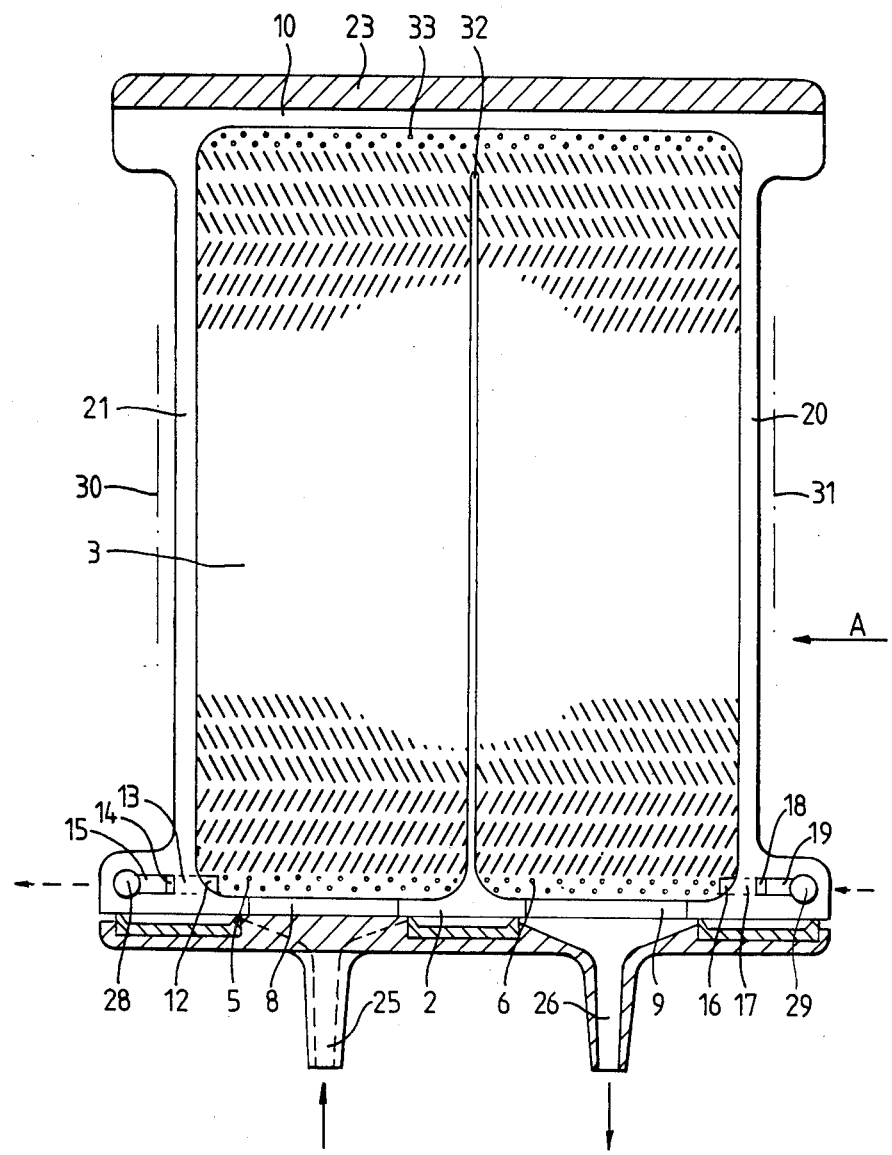
FIG. 10 is a top view of a modified form of the apparatus shown in FIG. 5.

FIG. 10 shows a modification of the apparatus shown in FIGS. 5 to 9, in which the plates A and B have a median baffle 32 on each of their faces, this enabling the fluids [blood and dialysis liquid] to have a longer path, this path being substantially U-shaped, and the plates further having a distribution zone 33 along their edge 10. In FIG. 10, only a plate A is shown, not in section, whereas the lateral plates 23 and 24 of the holding device are shown in section, this section passing through the tube 26 for discharging the blood which has circulated in contact with the membranes 1. As shown in this FIG. 10, the tube 25 for introducing the blood is lower, relative to the plane containing the tube 26. In this apparatus, all the characteristics of the apparatus shown in FIGS. 5 to 9, and hence the same reference numerals, are to be found again. As in the apparatus according to FIGS. 5 to 9, the edges 30 and 31 of the membranes do not cover the passages 28 and 29 and are located on the channels 15 and 19. A plate B [not shown] has the same structural characteristics as a plate A, the only difference arising from the fact that the exposed channels 13, 15, 17 and 19 are on the opposite face to that on which these channels are located on the plate A.

Thus, the blood enters the apparatus through the tube 25, divides up between the membranes of two plates A and B in the so-called distribution zone 5, after having passed through the exposed channels 8 and 8a, flows between the membranes 1 in the exchange zones 3, 3a between the edges 21 and the baffles 32, reaches the distribution zones 33 and flows into the exchange zones 3, 3a, between the baffles 32 and the edges 20, reaches the distribution zones 6, passes through the channels 9, 9a and leaves the apparatus through the tube 26.

The dialysis liquid enters the apparatus through a tube [not shown] emerging in the duct formed by the superposed passages 29 in each plate A and B, and then passes through the channels 19, the holes 18, the channels 17, the holes 16 and the distribution zone 6, and over the faces of the plates, following a U-shaped path, after having passed through the distribution zone 33, reaches the distribution zones 5, passes through the holes 12, the channels 13, the holes 14 and the channels 15 and arrives in the passage 28 in each plate, which passage forms, in the stack, a duct connected to a tube [not shown] for discharging this fluid. It should be noted that, in the apparatus such as shown in FIG. 10, each plate A is symmetrical relative to a median plane perpendicular to the edge 2 covered by a membrane 1, and that therefore, in the stack, a plate B can be conaidered as a plate A which has been turned through 180 degrees about its median axis perpendicular to the edge 2 covered by a membrane 1. Furthermore, the membranes 1 can, if appropriate, cover the passages 28 and 29 when the stack is assembled, and holes are then subsequently cut in order to permit the distribution, into the apparatus, of the fluid flowing in contact with the exchange and/or separation zones 3, 3a of each plate.

The apparatuses according to the present invention can be constructed with plates A and B of very low thickness, namely of the order of half a millimetre, whereby apparatuses of this type, which comprise only plates and membranes in their stack, have a large surface area per unit volume. Furthermore, apparatuses of this type are extremely easy to assemble, which facilitates the automation of their assembly and makes it possible to obtain high production rates. In fact, the procedure generally used is to assemble two stacks next to one another simultaneously, the plates A and B of each stack having their exposed channels 8, 8a and 9, 9a respectively on the right for the righthand stack and on the left for the lefthand stack, the two stacks being viewed from the end of the plates, for example along the edge 21. It then suffices to cut the membrane between the two stacks, that is to say near the adjacent edges 10. To construct the two stacks simultaneously, a known device is used which enables the roll of membrane used to execute a to-and-fro movement so as to obtain pleated folding. Each time the membrane passes over the width of the stacks, viewed from the end, for example along the edge 21, a plate is placed on one stack during the out movement and a plate is placed on the other stack during the return movement, so that two layers of membrane are formed between each adjacent plate of each stack.

Although the apparatuses described above have been presented essentially as artificial kidneys for haemodialysis, they can nevertheless have other applications, in particular as an artificial lung for oxygenating blood with gaseous mixtures containing oxygen. By way of examples, they can also be used as ultrafiltration kidneys or as plasmapheresis apparatuses for separating plasma from blood. For the latter applications relating more precisely to the separation of a fluid into two fractions, it is not necessary for apparatuses of this type to have two outlets for the initial fluid fraction which has passed through the membranes. Thus, if the blood circulates between the membranes, and the apparatus is used as an ultrafilter or as a plasmapheresis apparatus, it suffices for each plate A and B to have only one assembly consisting, for example, of a first hole 12, an exposed channel 13, a second hole 14 and a second exposed channel 15, the latter emerging on the side of an edge of the plate or being in communication with a passage 28; the apparatus thus has only one outlet for the fluid flowing in contact with the plates.

We claim:

1. Fluid treatment apparatus comprising:
   means for enabling said fluid to be introduced and discharged on the same side of the apparatus, including,
   (a) - a stack of superposed essentially imperforate plates, the stack having plates of a type A alternating with plates of type B;
   (b) - opposite major faces on each plate;
   (c) - a semi-permeable membrane overlying each of said faces of each plate of the stack, the semi-permeable membrane being folded around one edge of each said plate, each edge being superposed in the stack and forming a lateral face of the stack;
   (d) - means defining an exchange zone (3,3a) on each of said faces of each plate;
   (e) - means defining distribution zones (5,5a) on each of said faces of each plate, with a distribution zone at each opposite end of each exchange zone;
   (f) - two first grooves, (8,9 and 8a, 9a) formed in each of said faces of each of said plates and emerging from and perpendicular to the side of the edge of each of said plates around which a membrane is folded, each semi-permeable membrane overlying and extending into said first grooves of each of the associated plates, the first grooves (8,9) of one face of a plate being in back to back superposed relation to the first grooves (8a,9a) of the opposite face, the first grooves of a plate of type A being superposed with the first grooves of a plate of type B, one group of first grooves (8,8a) constituting a flow path for the liquid to be treated which is introduced from the said lateral face of the stack between the membranes, located between adjacent plates and one group of first grooves (9,9a) constituting a flow path for the treated liquid which is removed from the said lateral face of the stack between the membranes, said first grooves communicating with said exchange zones (3,3a) via said distribution zones (5,6);
   (g) - a first passage (12) extending through each plate and connecting one of said distribution zones on one face of that plate with a distribution zone on the opposite face of that plate;
   (h) - a second groove (13) located on one face of each plate and communicating with said first passage;
   (i) - a second passage (14) extending through each plate and communicating with said second groove;
   (j) - a third groove (15) located on the opposite face of each plate to said one face on which the second groove (13) is located and communicating with said second passage (14), the first and second passages of a plate of type A being superposed with the first and second passages respectively of a plate of type B, the second and third grooves of a plate of type A being of the opposite faces of those of a plate of type B, the first passage, second groove, second passage and third groove enabling the withdrawing of a fluid being in contact with the faces of the plates;
   (k) - means for enabling the introduction of a fluid being in contact with the faces of the plates;
   (l) - means for arranging said location where a fluid to be treated is introduced and location where the treated fluid is discharged on said distribution zones at diagonally opposite ends of each exchange zone.

2. Apparatus as claimed in claim 1 each of said plates of type A and each of said plates of type B further comprising;
   (m) - a third passage (16) extending through each plate and connecting the other of distribution zones (6) on one face of that plate with the other of said distribution zones on the opposite face thereof;
   (n) - a fourth groove (17) located on said one face of each plate and communicating with said third passage (16);
   (o) - fourth passage (18) extending through each plate and communicating with the fourth groove (17);
   (p) - a fifth groove (19) located on the opposite face of each plate to said one face on which the second (13) and fourth (17) grooves are located and communicating with said fourth passage (18), the third and fourth passages of a plate of type B, the fourth and fifth grooves of a plate of type A being on the opposite faces to those of a plate of type B, the third passage, fourth groove, fourth passage and fifth groove enabling the introduction of a fluid flowing in contact with the faces of the plates.

3. Apparatus as claimed in claim 2 wherein the membranes cover the first, second, third and fourth passages and the second and fourth grooves and at least partly cover the third and fifth grooves of each plate.

4. Apparatus as claimed in claim 2 and further comprising at least two spaced apertures (28,29) in each of said plates, the aperture of each plate being at the same location to overlie one another and form at least two ducts through the stack, said third and fifth grooves emerging each in a different one of said ducts.

5. Apparatus as claimed in claim 2 and further comprising on each face of each plate two baffles (11), one adjacent each of said first grooves, the baffles on one face being directly opposite those on the other face so that they overlie one another all along their length in the stack, the baffles extending transversely from said one edge of the plate around which a membrane is folded to a point spaced from the opposite edge and dividing the adjacent first groove from its adjacent distribution zone, each first groove merging with its adjacent distribution zone beyond said point.

6. Apparatus as claimed in claim 2 wherein said distribution zones are all located adjacent said one edge of each plate around which a membrane is folded and further comprising a median baffle (32) on each face of each plate, the median baffle on one face being immediately opposite that on the other all along their length, each median baffle extending transversely from said one edge of the plate to a point spaced from the opposite edge and dividing the two distribution zones on the face on which the baffle is located from one another.

7. Apparatus as claimed in claim 2 wherein the plates of type A and the plates of type B each have a maximum thickness of less than 1.2 mm.

8. Apparatus as claimed in claim 2 wherein each plate is symmetrical about a median plane perpendicular to said one edge around which a membrane is folded and wherein each plate of type B is identical to each plate A which has been turned through 180 degrees about a median axis perpendicular to said one edge and being in the same plane as the said plate.

9. Apparatus as claimed in claim 2 wherein said apparatus is used as a haemodilyser and further comprising means to feed blood between the two membranes located between each adjacent pair of plates and to withdraw blood from between said two membranes and means to supply and withdraw dialysis liquid to and from each face of each plate and the adjacent membrane.

10. Fluid treatment apparatus as claimed in claim 1, in which said means for arranging said location where fluid to be treated is introduced and location where the treated fluid is discharged on said distribution zones at diagonally opposite ends of each exchange zone comprise on each face of each plate and beyond its distribution zone at least a baffle (11) separating each said distribution zone from each corresponding first groove merging into said distribution zone.

11. Fluid treatment apparatus as claimed in claim 10, in which each baffle (11) extends along said corresponding first groove from one edge (2) of said plate to a point near the opposite edge (10).

12. Fluid treatment apparatus as claimed in claim 10 or 11, in which each baffle (11) on one face of the plate is located back to back a baffle on the opposite face of said plate so that they overlie one another along their length in the stack.

13. Fluid treatment apparatus as claimed in claim 1 further comprising means for arranging inlet and outlet for a fluid being in contact with the faces of the plates beyond said opposite distribution zones at diagonally opposite ends of each exchange zone.

14. Fluid treatment apparatus as claimed in claim 13 in which said means for arranging inlet and outlet for a fluid being in contact with the faces of the plates beyond said opposite distribution zones at diagonally opposite ends of each exchange zone comprise two passages (12, 16).

* * * * *